(12) United States Patent
Clark et al.

(10) Patent No.: US 7,174,398 B2
(45) Date of Patent: Feb. 6, 2007

(54) METHOD AND APPARATUS FOR IMPLEMENTING DATA MAPPING WITH SHUFFLE ALGORITHM

(75) Inventors: Scott Douglas Clark, Rochester, MN (US); Charles Ray Johns, Austin, TX (US); Jeffrey Joseph Ruedinger, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 556 days.

(21) Appl. No.: 10/607,360

(22) Filed: Jun. 26, 2003

(65) Prior Publication Data

US 2004/0267767 A1    Dec. 30, 2004

(51) Int. Cl.
G06F 13/00 (2006.01)
G06F 13/12 (2006.01)
G06F 15/16 (2006.01)

(52) U.S. Cl. .......................... 710/66; 710/65
(58) Field of Classification Search ............ 710/65, 710/66
See application file for complete search history.

(56) References Cited

U.S. PATENT DOCUMENTS

| | | | | |
|---|---|---|---|---|
| 5,162,795 A | * | 11/1992 | Shirota | 341/67 |
| 5,768,546 A | * | 6/1998 | Kwon | 710/307 |
| 6,122,284 A | * | 9/2000 | Tasdighi et al. | 370/438 |
| 6,950,889 B2 | * | 9/2005 | Ishida et al. | 710/65 |
| 7,000,136 B1 | * | 2/2006 | Alexander et al. | 713/400 |
| 2003/0007513 A1 | * | 1/2003 | Barker et al. | 370/476 |
| 2003/0037190 A1 | * | 2/2003 | Alexander et al. | 710/52 |
| 2003/0041163 A1 | * | 2/2003 | Rhoades et al. | 709/232 |
| 2003/0081624 A1 | * | 5/2003 | Aggarwal et al. | 370/412 |
| 2003/0118058 A1 | * | 6/2003 | Kim et al. | 370/535 |
| 2004/0190553 A1 | * | 9/2004 | Ward et al. | 370/474 |

* cited by examiner

*Primary Examiner*—Kim Huynh
*Assistant Examiner*—Scott Sun
(74) *Attorney, Agent, or Firm*—Joan Pennington

(57) ABSTRACT

A method and apparatus are provided for implementing data mapping using a shuffle algorithm. An output shuffler and an input shuffler convert a physical data group to a plurality of data subgroups. The physical data group includes a plurality of bits and each subgroup includes a subplurality of bits. The output shuffler performs an output shuffle sequence for providing a predefined output pattern of ordered subplurality data bits. The predefined output pattern of ordered subplurality data bits is applied to the input shuffler. The input shuffler performs a reverse shuffle sequence. For each shuffle transfer a number of first header bytes of a packet are located at a first one of a plurality of physical layer links. Both the output shuffler and the input shuffler are implemented with minimized logic required to keep a largest multiplexer as a 4-to-1 multiplexer, resulting in minimal area and power being used for implementing the shuffle sequence and reverse shuffle sequence.

29 Claims, 19 Drawing Sheets

OUTPUT STAGING 400

| STAGE | TIME → | | | TIME → | | | | | | TIME → | | | | | TIME → | | | |
|---|---|---|---|---|---|---|---|---|---|---|---|---|---|---|---|---|---|---|
| | 0 | 1 | 2 | 0 | 1 | 2 | 3 | 4 | 5 | 0 | 1 | 2 | 3 | 4 | 0 | 1 | 2 | 3 |
| | X6 OUTPUT | | | X5 OUTPUT | | | | | | X4 OUTPUT | | | | | X3 OUTPUT | | | |
| A | A0 | A1 | A2 | A0 | A1 | A2 | A3 | A3 | A4 | A0 | A1 | A1 | A2 | A3 | A0 | A0 | A1 | A1 |
| B | B0 | B1 | B2 | B0 | B1 | B2 | B3 | B3 | B4 | B0 | B1 | B1 | B2 | B3 | B0 | B0 | B1 | B1 |
| C | C0 | C1 | C2 | C0 | C1 | C2 | C3 | C3 | C4 | C0 | C1 | C1 | C2 | C3 | C0 | C0 | C1 | C1 |
| D | D0 | D1 | D2 | D0 | D1 | D2 | D3 | D3 | D4 | D0 | D1 | D1 | D2 | D3 | D0 | D0 | D1 | D1 |
| E | E0 | E1 | E2 | E0 | E1 | E2 | E3 | E3 | E4 | E0 | E1 | E1 | E2 | E3 | E0 | E0 | E1 | E1 |
| F | F0 | F1 | F2 | F0 | F1 | F2 | F3 | F3 | F4 | F0 | F1 | F1 | F2 | F3 | F0 | F0 | F1 | F1 |
| A' | - | - | - | - | - | D1 | A2 | - | - | - | - | - | - | - | - | D0 | - | D1 |
| B' | - | - | - | - | - | E1 | B2 | - | - | - | E0 | - | - | E2 | - | E0 | - | E1 |
| C' | - | - | - | - | - | - | F2 | - | - | - | F0 | - | - | F2 | - | F0 | - | F1 |
| -- | | | | | | | | | | | | | | | | | | |
| E' | - | - | - | - | F0 | - | - | F3 | - | - | - | - | - | - | - | - | - | - |
| -- | - | - | - | | | | | | | | | | | | | | | |
| A" | - | A0 | A1 | - | A0 | A1 | D1 | A2 | A3 | - | A0 | D1 | A1 | A2 | - | A0 | D0 | A1 |
| B" | - | B0 | B1 | - | B0 | B1 | E1 | B2 | B3 | - | B0 | E0 | B1 | B2 | - | B0 | E0 | B1 |
| C" | - | C0 | C1 | - | C0 | C1 | C2 | F2 | C3 | - | C0 | F0 | C1 | C2 | - | C0 | F0 | C1 |
| D" | - | D0 | D1 | - | D0 | F1 | D2 | D3 | X | - | D0 | F1 | E1 | D2 | | | | |
| E" | - | E0 | E1 | - | E0 | F0 | E2 | E3 | F3 | | | | | | | | | |
| F" | - | F0 | F1 | | | | | | | | | | | | | | | |

FIG. 4A

OUTPUT STAGING 400

| STAGE | TIME → | | | | | | TIME → | | | | | | | |
|---|---|---|---|---|---|---|---|---|---|---|---|---|---|---|
| | 0 | 1 | 2 | 3 | 4 | 5 | 0 | 1 | 2 | 3 | 4 | 5 | 6 | 7 |
| | X2 OUTPUT | | | | | | X1 OUTPUT | | | | | | | |
| A | A0 | A0 | A0 | A1 | A1 | A1 | A0 | A0 | A0 | A0 | A0 | A0 | A1 | A1 |
| B | B0 | B0 | B0 | B1 | B1 | B1 | B0 | B0 | B0 | B0 | B0 | B0 | B1 | B1 |
| C | C0 | C0 | C0 | C1 | C1 | C1 | C0 | C0 | C0 | C0 | C0 | C0 | C1 | C1 |
| D | D0 | D0 | D0 | D1 | D1 | D1 | D0 | D0 | D0 | D0 | D0 | D0 | D1 | D1 |
| E | E0 | E0 | E0 | E1 | E1 | E1 | E0 | E0 | E0 | E0 | E0 | E0 | E1 | E1 |
| F | F0 | F0 | F0 | F1 | F1 | F1 | F0 | F0 | F0 | F0 | F0 | F0 | F1 | F1 |
| A' | - | C0 | - | - | C1 | - | - | - | - | - | C0 | - | - | - |
| B' | - | F0 | E0 | - | F1 | E1 | - | E0 | F0 | B0 | - | - | - | E1 |
| C' | - | - | - | - | - | - | - | - | - | - | - | - | - | - |
| -- | | | | | | | | | | | | | | |
| E' | - | - | - | - | - | - | - | - | - | - | - | - | - | - |
| -- | | | | | | | | | | | | | | |
| A" | - | A0 | C0 | D0 | A1 | C1 | - | A0 | E0 | F0 | B0 | C0 | D0 | A1 |
| B" | - | B0 | F0 | E0 | B1 | F1 | | | | | | | | |
| C" | | | | | | | | | | | | | | |
| D" | | | | | | | | | | | | | | |
| E" | | | | | | | | | | | | | | |
| F" | | | | | | | | | | | | | | |

FIG. 4B

INPUT STAGING 500

| STAGE | TIME → | | | TIME → | | | | | | TIME → | | | | | TIME → | | | |
|---|---|---|---|---|---|---|---|---|---|---|---|---|---|---|---|---|---|---|
| | 0 | 1 | 2 | 0 | 1 | 2 | 3 | 4 | 5 | 0 | 1 | 2 | 3 | 4 | 0 | 1 | 2 | 3 |
| | X6 INPUT | | | X5 INPUT | | | | | | X4 INPUT | | | | | X3 INPUT | | | |
| A | A0 | A1 | A2 | A0 | A1 | D1 | A2 | A3 | A4 | A0 | D1 | A1 | A2 | D3 | A0 | D0 | A1 | D1 |
| B | B0 | B1 | B2 | B0 | B1 | E1 | B2 | B3 | B4 | B0 | E0 | B1 | B2 | E2 | B0 | E0 | B1 | E1 |
| C | C0 | C1 | C2 | C0 | C1 | C2 | F2 | C3 | C4 | C0 | F0 | C1 | C2 | F2 | C0 | F0 | C1 | F1 |
| D | D0 | D1 | D2 | D0 | F1 | D2 | D3 | X | D4 | D0 | F1 | E1 | D2 | F3 | | | | |
| E | E0 | E1 | E2 | E0 | F0 | E2 | E3 | F3 | E4 | | | | | | | | | |
| F | F0 | F1 | F2 | | | | | | | | | | | | | | | |
| A' | - | - | - | - | - | A1 | - | - | - | - | - | - | - | - | - | - | - | - |
| B' | - | - | - | - | - | B1 | - | - | - | - | - | - | - | - | - | - | - | - |
| C' | - | - | - | - | - | C1 | C2 | - | - | - | - | - | - | - | - | - | - | - |
| D' | - | - | - | - | - | D2 | D3 | - | - | - | - | D1 | - | - | - | - | - | - |
| E' | - | - | - | - | - | E2 | E3 | - | - | - | - | - | - | - | - | - | - | - |
| F' | - | - | - | - | - | F1 | - | - | - | - | - | F1 | - | - | - | - | - | - |
| A" | - | A0 | A1 | - | A0 | A0 | A1 | A2 | A3 | - | A0 | A0 | A1 | A2 | - | A0 | A0 | A1 |
| B" | - | B0 | B1 | - | B0 | B0 | B1 | B2 | B3 | - | B0 | B0 | B1 | B2 | - | B0 | B0 | B1 |
| C" | - | C0 | C1 | - | C0 | C0 | C1 | C2 | C3 | - | C0 | C0 | C1 | C2 | - | C0 | C0 | C1 |
| D" | - | D0 | D1 | - | D0 | D0 | D1 | D2 | D3 | - | D0 | D0 | D1 | D2 | - | - | D0 | - |
| E" | - | E0 | E1 | - | E0 | E0 | E1 | E2 | E3 | - | - | E0 | E1 | - | - | - | E0 | - |
| F" | - | F0 | F1 | - | F0 | F0 | F1 | F2 | F3 | - | - | F0 | F1 | - | - | - | F0 | - |

FIG. 5A

INPUT STAGING 500

| STAGE | TIME → | | | | | | TIME → | | | | | | | |
|---|---|---|---|---|---|---|---|---|---|---|---|---|---|---|
| | 0 | 1 | 2 | 3 | 4 | 5 | 0 | 1 | 2 | 3 | 4 | 5 | 6 | 7 |
| | X2 INPUT | | | | | | X1 INPUT | | | | | | | |
| A | A0 | C0 | D0 | A1 | C1 | D1 | A0 | E0 | F0 | B0 | C0 | D0 | A1 | E1 |
| B | B0 | F0 | E0 | B1 | F1 | E1 | | | | | | | | |
| C | | | | | | | | | | | | | | |
| D | | | | | | | | | | | | | | |
| E | | | | | | | | | | | | | | |
| F | | | | | | | | | | | | | | |
| A' | - | - | - | - | - | - | - | - | - | - | B0 | - | - | - |
| B' | - | - | - | - | - | - | - | - | - | - | - | - | - | - |
| C' | - | - | - | - | - | - | - | - | - | - | - | - | - | - |
| D' | - | - | - | - | - | - | - | - | E0 | F0 | - | - | - | - |
| E' | - | - | - | - | - | - | - | - | - | E0 | - | - | - | - |
| F' | - | - | F0 | - | - | F1 | - | - | - | - | F0 | - | - | - |
| A" | - | A0 | A0 | A0 | A1 | A1 | - | A0 | A0 | A0 | A0 | A0 | A0 | A1 |
| B" | - | B0 | B0 | B0 | B1 | B1 | - | - | - | - | - | B0 | B0 | - |
| C" | - | - | C0 | C0 | - | C1 | - | - | - | - | - | C0 | C0 | - |
| D" | - | - | - | D0 | - | - | - | - | - | - | - | - | D0 | - |
| E" | - | - | - | E0 | - | - | - | - | - | - | E0 | E0 | E0 | - |
| F" | - | - | - | F0 | - | - | - | - | - | - | - | F0 | F0 | - |

| LINK A | LINK B | LINK C | LINK D | LINK E | LINK F |

DATA LINK LAYER X6 MAPPING
TIME (2 BYTES HEADER PLUS 16 BYTES DATA PER PDG, 1 PDG PER CYCLE)

| H0 | H1 | D0 | D1 | D2 | D3 | D4 | D5 | D6 | D7 | D8 | D9 | Da | Db | Dc | Dd | De | Df |
|----|----|----|----|----|----|----|----|----|----|----|----|----|----|----|----|----|----|
| H2 | H3 | D10 | D11 | D12 | D13 | D14 | D15 | D16 | D17 | D18 | D19 | D1a | D1b | D1c | D1d | D1e | D1f |
| H4 | H5 | D20 | D21 | D22 | D23 | D24 | D25 | D26 | D27 | D28 | D29 | D2a | D2b | D2c | D2d | D2e | D2f |
| H6 | H7 | D30 | D31 | D32 | D33 | D34 | D35 | D36 | D37 | D38 | D39 | D3a | D3b | D3c | D3d | D3e | D3f |

FIG. 6B  610

| LINK A | LINK B | LINK C | LINK D | LINK E | LINK F |

DATA LINK LAYER X5 MAPPING
X6 INPUT (2 BYTES HEADER PLUS 16 BYTES DATA PER PDG,
TIME PATTERN SPANS 4 PDGs OVER 5 CYCLES)

| H0 | H1 | D0 | D1 | D2 | D3 | D4 | D5 | D6 | D7 | D8 | D9 | Da | Db | Dc | Dd | De | Df |
|----|----|----|----|----|----|----|----|----|----|----|----|----|----|----|----|----|----|
| H2 | H3 | D10 | D11 | D12 | D13 | D14 | D15 | D16 | D17 | D18 | D19 | D1a | D1b | D1c | D1d | D1e | D1f |
| H4 | H5 | D20 | D21 | D22 | D23 | D24 | D25 | D26 | D27 | D28 | D29 | D2a | D2b | D2c | D2d | D2e | D2f |
| H6 | H7 | D30 | D31 | D32 | D33 | D34 | D35 | D36 | D37 | D38 | D39 | D3a | D3b | D3c | D3d | D3e | D3f |
| H6 | H7 | D30 | D31 | D32 | D33 | D34 | D35 | D36 | D37 | D38 | D39 | D3a | D3b | D3c | D3d | D3e | D3f |

X5 MAPPING

| H0 | H1 | D0 | D1 | D2 | D3 | D4 | D5 | D6 | D7 | D8 | D9 | Da | Db | Dc | - | - | - |
|----|----|----|----|----|----|----|----|----|----|----|----|----|----|----|----|----|----|
| H2 | H3 | D10 | D11 | D12 | D13 | D14 | D15 | D16 | D1d | D1e | D1f | Dd | De | Df | - | - | - |
| D17 | D18 | D19 | D1a | D1b | D1c | D24 | D25 | D26 | D27 | D28 | D29 | D2a | D2b | D2c | - | - | - |
| H4 | H5 | D20 | D21 | D22 | D23 | D2d | D2e | D2f | D37 | D38 | D39 | D3a | D3b | D3c | - | - | - |
| H6 | H7 | D30 | D31 | D32 | D33 | D34 | D35 | D36 | - | - | - | D3d | D3e | D3f | - | - | - |

X6 OUTPUT

| - | - | - | - | - | - | - | - | - | - | - | - | - | - | - | - | - | - |
|----|----|----|----|----|----|----|----|----|----|----|----|----|----|----|----|----|----|
| H0 | H1 | D0 | D1 | D2 | D3 | D4 | D5 | D6 | D7 | D8 | D9 | Da | Db | Dc | Dd | De | Df |
| H2 | H3 | D10 | D11 | D12 | D13 | D14 | D15 | D16 | D17 | D18 | D19 | D1a | D1b | D1c | D1d | D1e | D1f |
| H4 | H5 | D20 | D21 | D22 | D23 | D24 | D25 | D26 | D27 | D28 | D29 | D2a | D2b | D2c | D2d | D2e | D2f |
| H6 | H7 | D30 | D31 | D32 | D33 | D34 | D35 | D36 | D37 | D38 | D39 | D3a | D3b | D3c | D3d | D3e | D3f |

| LINK A | LINK B | LINK C | LINK D | LINK E | LINK F |

TIME

X6 INPUT

DATA LINK LAYER X4 MAPPING
(2 BYTES HEADER PLUS 16 BYTES DATA PER PDG,
PATTERN SPANS 2 PDGs OVER 3 CYCLES)

| H0 | H1 | D0 | D1 | D2 | D3 | D4 | D5 | D6 | D7 | D8 | D9 | Da | Db | Dc | Dd | De | Df |
|----|----|----|----|----|----|----|----|----|----|----|----|----|----|----|----|----|----|
| H2 | H3 | D10 | D11 | D12 | D13 | D14 | D15 | D16 | D17 | D18 | D19 | D1a | D1b | D1c | D1d | D1e | D1f |
| H2 | H3 | D10 | D11 | D12 | D13 | D14 | D15 | D16 | D17 | D18 | D19 | D1a | D1b | D1c | D1d | D1e | D1f |

X4 MAPPING

| H0 | H1 | D0 | D1 | D2 | D3 | D4 | D5 | D6 | D7 | D8 | D9 | - | - | - | - | - | - |
|----|----|----|----|----|----|----|----|----|----|----|----|----|----|----|----|----|----|
| D17 | D18 | D19 | Da | Db | Dc | Dd | De | Df | D1d | D1e | D1f | - | - | - | - | - | - |
| H2 | H3 | D10 | D11 | D12 | D13 | D14 | D15 | D16 | D1a | D1b | D1c | - | - | - | - | - | - |

X6 OUTPUT

| - | - | - | - | - | - | - | - | - | - | - | - | - | - | - | - | - | - |
|----|----|----|----|----|----|----|----|----|----|----|----|----|----|----|----|----|----|
| H0 | H1 | D0 | D1 | D2 | D3 | D4 | D5 | D6 | D7 | D8 | D9 | Da | Db | Dc | Dd | De | Df |
| H2 | H3 | D10 | D11 | D12 | D13 | D14 | D15 | D16 | D17 | D18 | D19 | D1a | D1b | D1c | D1d | D1e | D1f |

| LINK A | LINK B | LINK C | LINK D | LINK E | LINK F |

TIME

X6 INPUT

DATA LINK LAYER X3 MAPPING
(2 BYTES HEADER PLUS 16 BYTES DATA PER PDG,
PATTERN SPANS 1 PDG OVER 2 CYCLES)

| H0 | H1 | D0 | D1 | D2 | D3 | D4 | D5 | D6 | D7 | D8 | D9 | Da | Db | Dc | Dd | De | Df |
| H0 | H1 | D0 | D1 | D2 | D3 | D4 | D5 | D6 | D7 | D8 | D9 | Da | Db | Dc | Dd | De | Df |

X3 MAPPING

| H0 | H1 | D0 | D1 | D2 | D3 | D4 | D5 | D6 | - | - | - | - | - | - | - | - | - |
| D7 | D8 | D9 | Da | Db | Dc | Dd | De | Df | - | - | - | - | - | - | - | - | - |

X6 OUTPUT

| - | - | - | - | - | - | - | - | - | - | - | - | - | - | - | - | - | - |
| H0 | H1 | D0 | D1 | D2 | D3 | D4 | D5 | D6 | D7 | D8 | D9 | Da | Db | Dc | Dd | De | Df |

| LINK A | LINK B | LINK C | LINK D | LINK E | LINK F |
|--------|--------|--------|--------|--------|--------|

TIME

DATA LINK LAYER X2 MAPPING
(2 BYTES HEADER PLUS 16 BYTES DATA PER PDG,
PATTERN SPANS 1 PDGs OVER 3 CYCLES)

X6 INPUT

| H0 | H1 | D0 | D1 | D2 | D3 | D4 | D5 | D6 | D7 | D8 | D9 | Da | Db | Dc | Dd | De | Df |
|----|----|----|----|----|----|----|----|----|----|----|----|----|----|----|----|----|----|
| H0 | H1 | D0 | D1 | D2 | D3 | D4 | D5 | D6 | D7 | D8 | D9 | Da | Db | Dc | Dd | De | Df |
| H0 | H1 | D0 | D1 | D2 | D3 | D4 | D5 | D6 | D7 | D8 | D9 | Da | Db | Dc | Dd | De | Df |

X2 MAPPING

| H0 | H1 | D0 | D1 | D2 | D3 | - | - | - | - | - | - | - | - | - | - | - | - |
|----|----|----|----|----|----|---|---|---|---|---|---|---|---|---|---|---|---|
| D4 | D5 | D6 | Dd | De | Df | - | - | - | - | - | - | - | - | - | - | - | - |
| D7 | D8 | D9 | Da | Db | Dc | - | - | - | - | - | - | - | - | - | - | - | - |

X6 OUTPUT

| - | - | - | - | - | - | - | - | - | - | - | - | - | - | - | - | - | - |
|---|---|---|---|---|---|---|---|---|---|---|---|---|---|---|---|---|---|
| - | - | - | - | - | - | - | - | - | - | - | - | - | - | - | - | - | - |
| H0 | H1 | D0 | D1 | D2 | D3 | D4 | D5 | D6 | D7 | D8 | D9 | Da | Db | Dc | Dd | De | Df |

| LINK A | LINK B | LINK C | LINK D | LINK E | LINK F |

DATA LINK LAYER X1 MAPPING
(2 BYTES HEADER PLUS 16 BYTES DATA PER PDG,
PATTERN SPANS 1 PDG OVER 6 CYCLES)

X6 INPUT
TIME

| H0 | H1 | D0 | D1 | D2 | D3 | D4 | D5 | D6 | D7 | D8 | D9 | Da | Db | Dc | Dd | De | Df |
|---|---|---|---|---|---|---|---|---|---|---|---|---|---|---|---|---|---|
| H0 | H1 | D0 | D1 | D2 | D3 | D4 | D5 | D6 | D7 | D8 | D9 | Da | Db | Dc | Dd | De | Df |
| H0 | H1 | D0 | D1 | D2 | D3 | D4 | D5 | D6 | D7 | D8 | D9 | Da | Db | Dc | Dd | De | Df |
| H0 | H1 | D0 | D1 | D2 | D3 | D4 | D5 | D6 | D7 | D8 | D9 | Da | Db | Dc | Dd | De | Df |
| H0 | H1 | D0 | D1 | D2 | D3 | D4 | D5 | D6 | D7 | D8 | D9 | Da | Db | Dc | Dd | De | Df |
| H0 | H1 | D0 | D1 | D2 | D3 | D4 | D5 | D6 | D7 | D8 | D9 | Da | Db | Dc | Dd | De | Df |

X1 MAPPING

| H0 | H1 | D0 | - | - | - | - | - | - | - | - | - | - | - | - | - | - | - |
|---|---|---|---|---|---|---|---|---|---|---|---|---|---|---|---|---|---|
| Da | Db | Dc | - | - | - | - | - | - | - | - | - | - | - | - | - | - | - |
| Dd | De | Df | - | - | - | - | - | - | - | - | - | - | - | - | - | - | - |
| D1 | D2 | D3 | - | - | - | - | - | - | - | - | - | - | - | - | - | - | - |
| D4 | D5 | D6 | - | - | - | - | - | - | - | - | - | - | - | - | - | - | - |
| D7 | D8 | D9 | - | - | - | - | - | - | - | - | - | - | - | - | - | - | - |

X6 OUTPUT

| - | - | - | - | - | - | - | - | - | - | - | - | - | - | - | - | - | - |
|---|---|---|---|---|---|---|---|---|---|---|---|---|---|---|---|---|---|
| - | - | - | - | - | - | - | - | - | - | - | - | - | - | - | - | - | - |
| - | - | - | - | - | - | - | - | - | - | - | - | - | - | - | - | - | - |
| - | - | - | - | - | - | - | - | - | - | - | - | - | - | - | - | - | - |
| - | - | - | - | - | - | - | - | - | - | - | - | - | - | - | - | - | - |
| H0 | H1 | D0 | D1 | D2 | D3 | D4 | D5 | D6 | D7 | D8 | D9 | Da | Db | Dc | Dd | De | Df |

OUTPUT STAGING 900

| STAGE | TIME → | | | | TIME → | | | | | | | TIME → | | | | |
|---|---|---|---|---|---|---|---|---|---|---|---|---|---|---|---|---|
| | 0 | 1 | 2 | 3 | 0 | 1 | 2 | 3 | 4 | 5 | 6 | 0 | 1 | 2 | 3 | 4 |
| | X6 OUTPUT | | | | X5 OUTPUT | | | | | | | X4 OUTPUT | | | | |
| A | A0 | A1 | A2 | A3 | A0 | A1 | A2 | A3 | A4 | A5 | A6 | A0 | A1 | A2 | A3 | A4 |
| B | B0 | B1 | B2 | B3 | B0 | B1 | B2 | B3 | B4 | B5 | B6 | B0 | B1 | B2 | B3 | B4 |
| C | C0 | C1 | C2 | C3 | C0 | C1 | C2 | C3 | C4 | C5 | C6 | C0 | C1 | C2 | C3 | C4 |
| A' | - | A0 | - | A2 | - | A0 | - | - | A3 | - | A5 | - | A0 | - | - | - |
| B' | - | B0 | - | B2 | - | B0 | - | - | B3 | - | B5 | - | B0 | B1 | - | - |
| C' | - | C0 | - | C2 | - | C0 | C1 | - | - | - | C5 | - | C0 | C1 | C2 | - |
| A" | - | - | A0 | - | - | - | A0 | A2 | A2 | A3 | - | - | - | A0 | A2 | A3 |
| B" | - | - | B0 | - | - | - | B0 | B2 | B2 | B3 | - | - | - | B0 | B1 | B3 |
| C" | - | - | C0 | - | - | - | C0 | C1 | - | C4 | - | - | - | C0 | C1 | C2 |
| D" | - | - | A1 | - | - | - | A1 | - | C3 | A4 | - | - | - | A1 | B2 | C3 |
| E" | - | - | B1 | - | - | - | B1 | C2 | - | B4 | - | | | | | |
| F" | - | - | C1 | - | | | | | | | | | | | | |

FIG. 9A

OUTPUT STAGING 900

| STAGE | TIME → | | | | TIME → | | | | | | TIME → | | | | | | | |
|---|---|---|---|---|---|---|---|---|---|---|---|---|---|---|---|---|---|---|
| | 0 | 1 | 2 | 3 | 0 | 1 | 2 | 3 | 4 | 5 | 0 | 1 | 2 | 3 | 4 | 5 | 6 | 7 |
| | X3 OUTPUT | | | | X2 OUTPUT | | | | | | X1 OUTPUT | | | | | | | |
| A | A0 | A1 | A2 | A3 | A0 | A1 | - | A2 | A3 | - | A0 | A0 | - | A1 | A1 | - | A2 | A2 |
| B | B0 | B1 | B2 | B3 | B0 | B1 | - | B2 | B3 | - | B0 | B0 | - | B1 | B1 | - | B2 | B2 |
| C | C0 | C1 | C2 | C3 | C0 | C1 | - | C2 | C3 | - | C0 | C0 | - | C1 | C1 | - | C2 | C2 |
| A' | - | - | - | - | - | C0 | A1 | - | C2 | A3 | - | - | C0 | - | - | C1 | - | - |
| B' | - | - | - | - | - | - | B1 | - | - | B3 | - | - | - | - | - | - | - | - |
| C' | - | - | - | - | - | - | - | - | - | - | - | - | - | - | - | - | - | - |
| A" | - | A0 | A1 | A2 | - | A0 | C0 | A1 | A2 | C2 | - | A0 | B0 | C0 | A1 | B1 | C1 | A2 |
| B" | - | B0 | B1 | B2 | - | B0 | C1 | B1 | B2 | C3 | | | | | | | | |
| C" | - | C0 | C1 | C2 | | | | | | | | | | | | | | |
| D" | | | | | | | | | | | | | | | | | | |
| E" | | | | | | | | | | | | | | | | | | |
| F" | | | | | | | | | | | | | | | | | | |

FIG. 9B

INPUT STAGING 1000

| STAGE | TIME → | | | | TIME → | | | | | | TIME → | | | | | |
|---|---|---|---|---|---|---|---|---|---|---|---|---|---|---|---|---|
| | 0 | 1 | 2 | 3 | 0 | 1 | 2 | 3 | 4 | 5 | 0 | 1 | 2 | 3 | 4 | 5 |
| | X6 INPUT | | | | X5 INPUT | | | | | | X4 INPUT | | | | | |
| A | A0 | - | A2 | - | A0 | A2 | A2 | A3 | - | A5 | A0 | A2 | A3 | - | A4 | A6 |
| B | B0 | - | B2 | - | B0 | B2 | B2 | B3 | - | B5 | B0 | B1 | B3 | - | B4 | B5 |
| C | C0 | - | C2 | - | C0 | C1 | - | C4 | - | C5 | C0 | C1 | C2 | - | C4 | C5 |
| D | A1 | - | A3 | - | A1 | - | C3 | A4 | - | A6 | A1 | B2 | C3 | - | A5 | B7 |
| E | B1 | - | B3 | - | B1 | C2 | - | B4 | - | B6 | | | | | | |
| F | C1 | - | C3 | - | | | | | | | | | | | | |
| A' | - | A1 | - | A3 | - | A1 | - | - | A4 | - | - | A1 | A2 | A3 | - | A5 |
| B' | - | B1 | - | B3 | - | B1 | C2 | - | B4 | - | - | - | B2 | B3 | - | - |
| C' | - | C1 | - | C3 | - | - | - | C3 | C4 | - | - | - | - | C3 | - | - |
| A" | - | A0 | A1 | A2 | - | A0 | A1 | A2 | A3 | A4 | - | A0 | A1 | A2 | A3 | A4 |
| B" | - | B0 | B1 | B2 | - | B0 | B1 | B2 | B3 | B4 | - | B0 | B1 | B2 | B3 | B4 |
| C" | - | C0 | C1 | C2 | - | C0 | C1 | C2 | C3 | C4 | - | C0 | C1 | C2 | C3 | C4 |

FIG. 10A

INPUT STAGING 1000

| STAGE | TIME → | | | TIME → | | | | | | TIME → | | | | | |
|---|---|---|---|---|---|---|---|---|---|---|---|---|---|---|---|
| | 0 | 1 | 2 | 0 | 1 | 2 | 3 | 4 | 5 | 0 | 1 | 2 | 3 | 4 | 5 |
| | X3 INPUT | | | X2 INPUT | | | | | | X1 INPUT | | | | | |
| A | A0 | A1 | A2 | A0 | C0 | A1 | A2 | C2 | A3 | A0 | B0 | C0 | A1 | B1 | C1 |
| B | B0 | B1 | B2 | B0 | C1 | B1 | B2 | C3 | B3 | | | | | | |
| C | C0 | C1 | C2 | | | | | | | | | | | | |
| D | | | | | | | | | | | | | | | |
| E | | | | | | | | | | | | | | | |
| F | | | | | | | | | | | | | | | |
| A' | - | - | - | - | A0 | - | - | A2 | - | - | - | - | - | - | - |
| B' | - | - | - | - | B0 | C1 | - | B2 | C3 | - | - | - | - | - | - |
| C' | - | - | - | - | - | - | - | - | - | - | - | - | - | - | - |
| A" | - | A0 | A1 | - | - | A0 | A1 | - | A2 | - | A0 | A0 | A0 | A1 | A1 |
| B" | - | B0 | B1 | - | - | B0 | B1 | - | B2 | - | - | B0 | B0 | - | B1 |
| C" | - | C0 | C1 | - | - | C0 | C1 | - | C2 | - | - | - | C0 | - | - |

FIG. 10B

METHOD AND APPARATUS FOR IMPLEMENTING DATA MAPPING WITH SHUFFLE ALGORITHM

FIELD OF THE INVENTION

The present invention relates generally to the data processing field, and more particularly, relates to a method and apparatus for implementing data mapping using a shuffle algorithm.

DESCRIPTION OF THE RELATED ART

Data mapping between different data path or dataflow widths often is required when transferring data between an integrated circuit chip and multiple physical links. The dataflow width of the chip typically is larger than each physical link. Also the number of physical links can be variable based upon system configuration.

For example, the data path or dataflow width of a known chip is 18 bytes wide and has to be reduced to between 1 and 6 links, with each link carrying 3 bytes before being sent or received due to a restricted number of chip I/O.

A need exists for an improved mechanism for data mapping between the dataflow widths of a chip to multiple physical links.

SUMMARY OF THE INVENTION

A principal object of the present invention is to provide a method and apparatus for implementing data mapping using a shuffle algorithm. Other important objects of the present invention are to provide such method and apparatus for implementing data mapping using a shuffle algorithm substantially without negative effect and that overcome some of the disadvantages of prior art arrangements.

In brief, a method and apparatus are provided for implementing data mapping using a shuffle algorithm. An output shuffler and an input shuffler convert a physical data group to a plurality of data subgroups. The physical data group includes a plurality of bits and each subgroup includes a subplurality of bits. The output shuffler performs an output shuffle sequence for providing a predefined output pattern of ordered subplurality data bits. The predefined output pattern of ordered subplurality data bits is applied to the input shuffler. The input shuffler performs a reverse shuffle sequence.

The output shuffler includes a first register stage including a first number of first stage registers, each first stage register is a subplurality of bits wide. A second register stage includes a second number of second stage registers and a third register stage includes the first number of third stage registers. Each of the second stage registers and third stage registers is a subplurality of bits wide. A plurality of multiplexers is coupled between selected ones of the first stage registers and the second stage registers and a plurality of multiplexers is coupled between selected ones of the second stage registers and the third stage registers. Selected ones of the first stage registers are connected to selected ones of the second stage registers and the third stage registers to enable funneling of subplurality bits in one cycle. The third stage registers provide the predefined output pattern of ordered subplurality data bits for each shuffle transfer.

The input shuffler includes a first register stage including a plurality of first stage registers, each first stage register is a subplurality of bits wide, and each first stage register receiving respective subplurality data bits of the predefined output pattern. A second register stage includes a plurality of second stage registers and a third register stage includes a plurality of third stage registers. Each of the second stage registers and third stage registers is a subplurality of bits wide. At least one multiplexer is coupled between selected ones of the first stage registers and at least one of the second stage registers and a plurality of multiplexers is coupled between selected ones of the second stage registers and the third stage registers. Selected ones of the first stage registers are connected to selected ones of the second stage registers to enable funneling of subplurality bits in one cycle. The third stage registers of the input shuffler provide a reverse shuffle sequence output.

In accordance with features of the invention, for each shuffle transfer a number of first header bytes of a packet are located at a first one of the plurality of physical layer links. A largest one of the plurality of multiplexers of both the output shuffler and the input shuffler is a 4-to-1 multiplexer. Both the output shuffler and the input shuffler are implemented with minimized logic required to keep the largest multiplexer as a 4-to-1 multiplexer, resulting in minimal area and power being used for implementing the shuffle sequence and reverse shuffle sequence.

BRIEF DESCRIPTION OF THE DRAWINGS

The present invention together with the above and other objects and advantages may best be understood from the following detailed description of the preferred embodiments of the invention illustrated in the drawings, wherein:

FIGS. 4A and 4B together provide a timing diagram illustrating output staging of the exemplary output shuffler of FIG. 2 in accordance with the preferred embodiment;

FIGS. 5A and 5B together provide a timing diagram illustrating input staging of the exemplary input shuffler of FIG. 3 in accordance with the preferred embodiment;

FIGS. 6A, 6B, 6C, 6C, 6D, 6E and 6F respectively illustrate shuffle patterns for mapping of data to physical layer links with the output shuffler and input shuffler of FIGS. 2 and 3 in accordance with the preferred embodiment;

FIGS. 9A and 9B together provide a timing diagram illustrating output staging of the exemplary output shuffler of FIG. 7 in accordance with the preferred embodiment; and FIGS. 10A and 10B together provide a timing diagram illustrating input staging of the exemplary input shuffler of FIG. 8 in accordance with the preferred embodiment.

DETAILED DESCRIPTION OF THE PREFERRED EMBODIMENTS

Figure 1A:
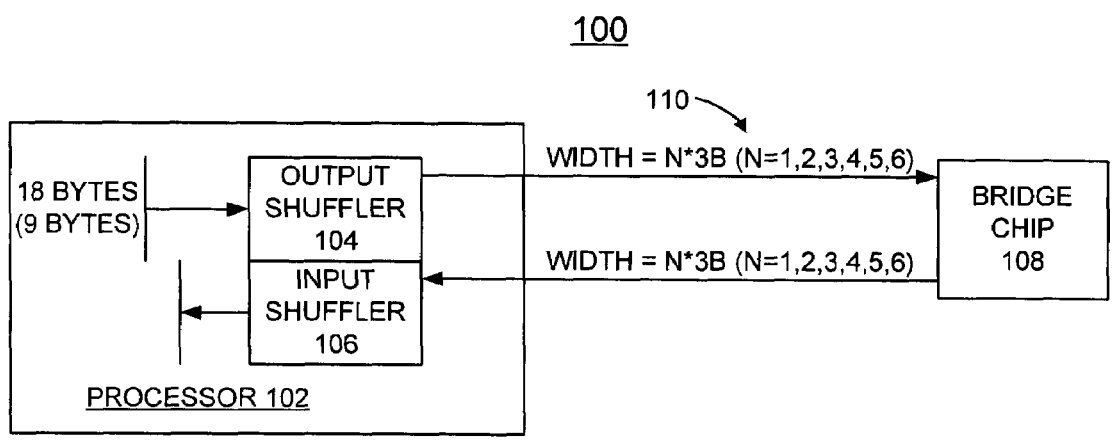
FIGS. 1A and 1B are block diagram representations respectively illustrating network processor systems for implementing data mapping using a shuffle algorithm in accordance with the preferred embodiment.
Figure 1B:
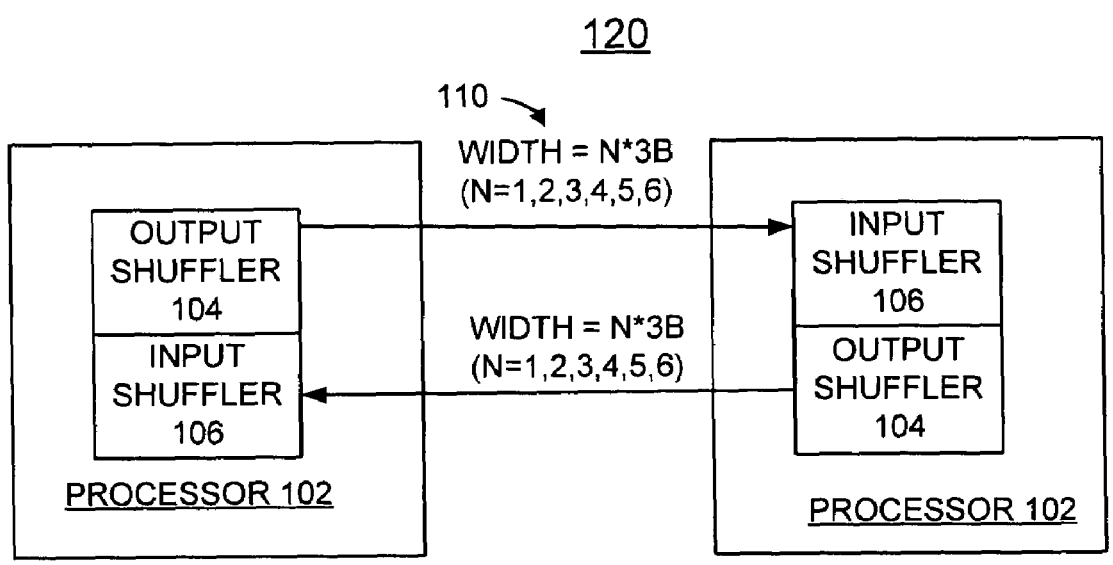

Having reference now to the drawings, in FIG. 1A and 1B, there are shown a respective network processor system generally designated by the reference characters 100, 120 for carrying out methods for implementing data mapping using a shuffle algorithm in accordance with the preferred embodiment. As shown in FIG. 1A, network processor system 100 includes a network processor 102. Network processor 102 includes an output shuffler 104 and an input shuffler 106 in accordance with the preferred embodiment. A bridge chip 108 is coupled to the network processor 102 by a pair of physical links generally designated by the reference character 110.

As shown in FIG. 1B, network processor system 120 includes a pair of network processor 102. Each network processor 102 includes an output shuffler 104 and an input shuffler 106 in accordance with the preferred embodiment. Physical links generally designated by the reference character 110.

In accordance with features of the preferred embodiment, the output shuffler 104 and input shuffler 106 are used to convert a physical data group (PDG) to a plurality of data subgroups. The PDG includes a plurality of bits based upon an internal interface width and each data subgroups includes a subplurality of bits. The output shuffler 104 performs an output shuffle sequence providing a predefined output pattern of ordered subplurality data bits. The predefined output pattern of ordered subplurality data bits is applied to the input shuffler 106. The input shuffler 106 performs a reverse shuffle sequence.

For example, as shown in FIG. 1A, network processor 102 has an internal processor dataflow width of 18 bytes (18 B), or 9 bytes (9 B), and the physical links 110 having a width equal N*3 B, where N=1,2,3,4,5,6 or a variable number of 3 B groups. Thus, in the illustrated network processor system 100, the output shuffler 104 and the input shuffler 106 converts between the 18 B to N*3 B, or 9 B to N*3 B, where N is variable number of 3 B groups based upon the system configuration. For example, in one case the bridge chip 108 may have 6 out bound and 4 in bound physical links 110 assigned. In another case the bridge chip 108 may have 3 out bound and 3 in bound physical links 110 assigned. In another case, a bridge chip 108 may include the output shuffler 104 and input shuffler 106.

It should be understood that the present invention is not limited to the illustrated network processor system 100. For example, output shuffler 104 and input shuffler 106 in accordance with the present invention could be used to convert between various other widths.

Figure 2:
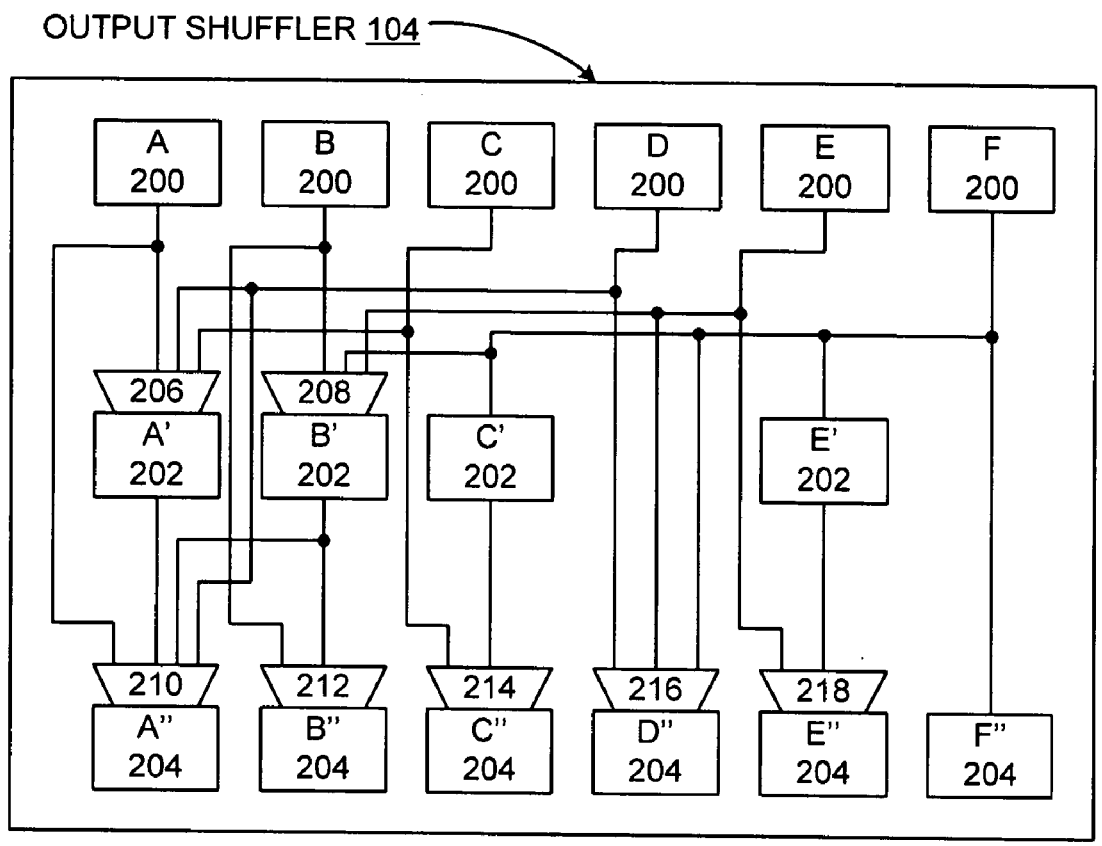
FIG. 2 is a schematic diagram representation illustrating an exemplary output shuffler of the network processor systems of FIGS. 1A and 1B in accordance with the preferred embodiment.
Figure 3:
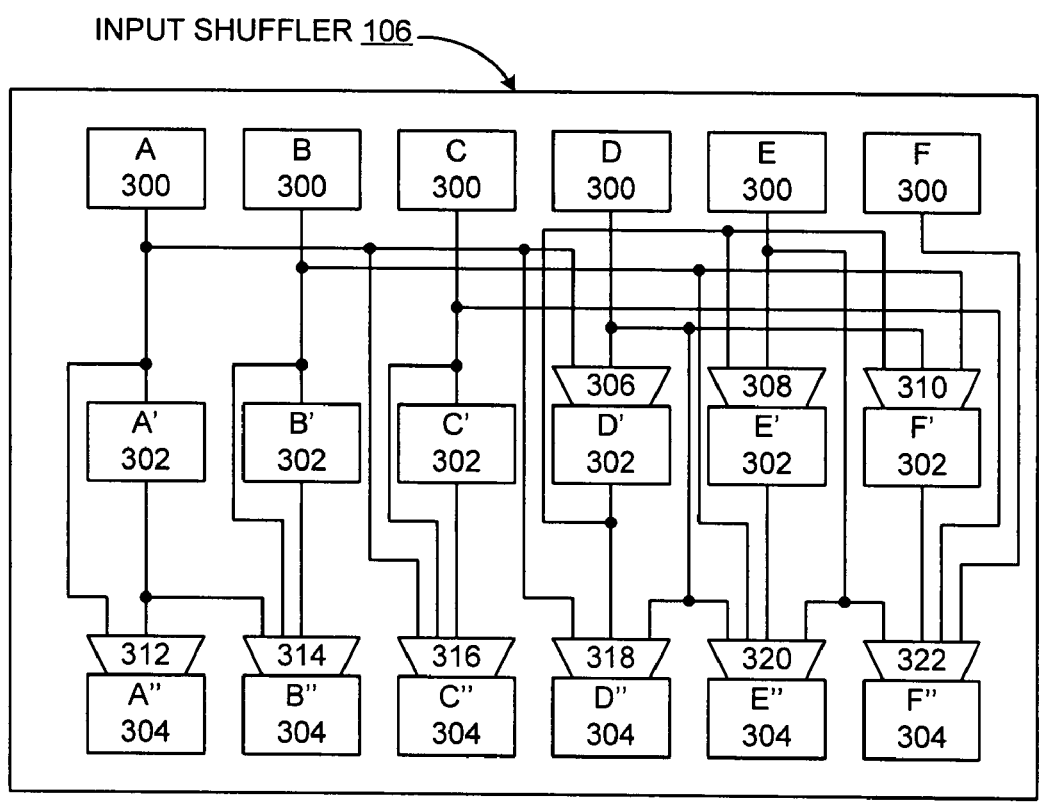
FIG. 3 is a schematic diagram representation illustrating an exemplary input shuffler of the network processor systems of FIGS. 1A and 1B in accordance with the preferred embodiment.

In accordance with features of the preferred embodiment, a shuffle algorithm is implemented for intelligently ordering the tri-bytes to minimize the amount of logic used and to keep the largest MUX to a 4-to-1 in size, as shown for the illustrated the output shuffler 104 and input shuffler 106 in FIGS. 2 and 3. This results in minimal area being used, enabling operation at high frequencies. Second, it always shuffles the first tri-byte of the first 18-byte transfer into the same position, a first link of multiple inbound and outbound links 110 of the first cycle of the shuffle sequence. This is required because this tri-byte carries start bits that define the beginning of an architected transfer packet. Without this positioning, all links would require start bit detection logic, thus requiring more area and possibly timing problems.

In accordance with features of the preferred embodiment, a shuffle algorithm enables the bandwidth of the data network processor system 100 to be reduced by configuring the Data Link Layer or the output shuffler 104 and input shuffler 106 to only use a subset of the physical layer links 110. For example, reduced bandwidth configurations include one (1), two (2), three (3), four (4), and five (5) links 110, while an internal interface width is fixed or remains constant. When fewer than six of the links 110 are used for the Output Data Network, the output shuffler 104 internally shuffles the processor data to the available physical links 110. A reverse shuffle is performed by the input shuffler 106 for the Input Data Network. FIGS. 6A, 6B, 6C, 6D, 6E, and 6F define shuffle patterns of the preferred embodiment and FIGS. 2 and 3 illustrate exemplary logic to perform the shuffle. FIGS. 4A and 4B and FIGS. 5A and 5B respectively illustrate the operation of various latches of the multiple register stages in an output shuffler 104 and an input shuffler 106 are used over time.

In accordance with features of the preferred embodiment, the shuffle algorithm is defined so that the valid bits defining the beginning of a new frame of data in three bytes A0=H0, H1,D0, can always be detected by the logic 106 performing the reverse shuffle or input shuffler 106 in the same link lane and in the first transfer of data for shuffled transfers of output shuffler 104. That is, the three bytes H0, H1, and D0 must always appear in the first link or Link A and in the first clock cycle when receiving a shuffle transfer, regardless of the amount of shuffling that is performed. This allows the reverse shuffling logic 106, and all logic upstream from this, to be shut off to save power when there is no data to unshuffle.

It should be understood however, the shuffle algorithm does force the restriction that all data must be shuffled by the sending side starting on PDG0 boundaries. For example, the Output Data Network shuffling logic or output shuffler 104 must always shuffle PDG0 with PDG1, PDG2 with PDG3, PDG4 with PDG5, PDG6 with PDG7, and the like in a 4 byte shuffle. Output shuffler 104 must also always shuffle PDG0 with PDG1, PDG2, PDG3; and PDG4 with PDG5, PDG6, PDG7, and the like in a 5 byte shuffle.

Referring now to FIG. 2, there is shown an exemplary output shuffler generally designated by the reference character 104 of the network processor system 100 in accordance with the preferred embodiment. The output shuffler 104 includes a first register stage including a plurality of first stage registers 200, A, B, C, D, E, F. Each first stage register 200 is a subplurality of bytes wide, such as 3B and each receives 3 bytes or a tri-byte of processor data coming into the output shuffler 104, as shown in FIGS. 4A and 4B. A second register stage includes a plurality of second stage registers 202, A', B', C', E'; and a third register stage includes a plurality of third stage registers 204, A", B", C", D", E", F". Each of the second stage registers 202 and third stage registers 204 is a subplurality of bytes wide, such as 3B. A plurality of multiplexers 206, 208 is coupled between the first stage registers 200, A, B, C, D, E, F; and the second stage registers 202, A', B'; and a plurality of multiplexers 210, 212, 214, 216, 218 is coupled between the first stage registers 200, A, B, C, D, E, F, the second stage registers 202, A', B', C', E' and the third stage registers 204, A", B", C", D", E". Multiplexer 210 is a 4-to-1 multiplexer and is the largest multiplexer. Multiplexers 206, 208, 216 are 3-to-1 multiplexers. Multiplexers 212, 214, 218 are 2-to-1 multiplexers. The first stage registers 200, A, B, C, D, E, and F are connected to selected ones of the second stage registers 202, A', B', C', and E' and the third stage registers 204, A", B", C", D", E", F" to enable funneling of subplurality bytes in one cycle. The third stage registers 204, A", B", C", D", E", F"

provides ordered subplurality data bytes for each shuffle transfer that are applied to the input shuffler 106 or bridge chip 108 using respective links 110.

FIG. 3 is a schematic diagram representation illustrating an exemplary input shuffler generally designated by the reference character 106 of the network processor system in accordance with the preferred embodiment. The input shuffler 106 includes a first register stage coupled to the third stage registers 204, A", B", C", D", E", F". The first register stage includes a plurality of first stage registers 300, A, B, C, D, E, F, each first stage register 300 is a subplurality of bytes wide, such as 3 B wide, and each first stage register 300 receiving respective 3 bytes or a tri-byte output from the output shuffler 104 or bridge chip 108 on respective links 110. A second register stage includes a plurality of second stage registers 302, A', B', C', D', E', F' and a third register stage includes a plurality of third stage registers 304, A", B", C", D", E", F". Each of the second stage registers 302, A', B', C', D', E', F' and third stage registers 304, A", B", C", D", E", F" is a subplurality of bytes wide, such as 3 B wide. A plurality of multiplexers 306, 308, 310 is coupled between the first stage registers 300, A, B, C, D, E, F, and the second stage registers 302 D', E', F', and a respective multiplexer 312, 314, 316, 318, 320, 322 is coupled between the first stage registers 300, A, B, C, D, E, F, the second stage registers 302, A', B', C', D', E', F' and the third stage registers 304, A", B", C", D", E", F" and selected ones of the first stage registers 300, A, B, C, D, E, F. Multiplexers 320, 322 are 4-to-1 multiplexers and are the largest multiplexers. Multiplexers 310, 314, 316, 318 are 3-to-1 multiplexers. Multiplexers 306, 308, 312 are 2-to-1 multiplexers. Selected ones of the first stage registers 300, A, B, C, D, E, F are connected to selected ones 302, A', B', C' of the second stage registers 302, A', B', C', D', E', F' and the first stage registers 300, A, B, C, D, E, F are connected to the multiplexers 306, 308, 310, 312, 314, 316, 318, 320, 322 to enable funneling of subplurality bytes in one cycle.

FIGS. 4A and 4B together provide a timing diagram illustrating output staging generally designated by the reference character 400 of the exemplary output shuffler 104 in accordance with the preferred embodiment. In FIGS. 4A and 4B, one complete shuffle sequence including X1 OUTPUT, X2 OUTPUT of FIG. 4B and X3 OUTPUT, X4 OUTPUT, X5 OUTPUT, X6 OUTPUT of FIG. 4A is shown for the output shuffler 104. One input sequence within highlighted or shaded time cycles of the mapping or output staging sequences X1 OUTPUT, X2 OUTPUT, X3 OUTPUT, X4 OUTPUT, X5 OUTPUT, X6 OUTPUT are shown to illustrate how these input sequence are shuffled onto the output. Data that must be held from a previous cycle in the input registers A, B, C, D, E, F is shown highlighted with a dotted background in the output staging sequences X1 OUTPUT, X2 OUTPUT, X3 OUTPUT, X4 OUTPUT, X5 OUTPUT, X6 OUTPUT.

As shown in FIGS. 4A and 4B, 3 bytes or a tri-byte of processor data coming into respective registers A–F of the output shuffler 104 are represented as shown in the following TABLE 1:

TABLE 1

A0, A1, A2, ... on Register A (A0 = H0,H1,D0; A1 = H2, H3, D1;...)
B0, B1, B2, ... on Register B (B0 = D1,D2,D3; B1 = D11,D12,D13;...)
C0, C1, C2, ... on Register C (C0 = D4,D5,D6; C1 = D14,D15,D16;...)
D0, D1, D2, ... on Register D (D0 = D7,D8,D9; D1 = D17,D18,D19;...)
E0, E1, E2, ... on Register E (E0 = Da,Db,Dc; D1 = D1a,D1b,D1c;...)
F0, F1, F2, ... on Register F (A0 = Dd,De,Df; A1 = D1d,D1e,D1f;...);

X = don't care

Referring also to FIGS. 5A and 5B together provide a timing diagram illustrating input staging generally designated by the reference character 500 of the exemplary input shuffler 106 in accordance with the preferred embodiment. In FIGS. 5A and 5B, one complete reverse shuffle sequence including X1 INPUT, X2 INPUT of FIG. 5B and X3 INPUT, X4 INPUT, X5 INPUT, X6 INPUT of FIG. 5A is shown for the input shuffler 106. As shown in FIGS. 5A and 5B, 3 bytes coming out of the input shuffler 106 are represented as shown in the following TABLE 2. Highlighted or shaded time cycles of the mapping or output staging sequences X1 OUTPUT, X2 OUTPUT, X3 OUTPUT, X4 OUTPUT, X5 OUTPUT, X6 OUTPUT show one shuffled input sequence and when that data can be validly read at output.

TABLE 2

A0, A1, A2, ... on Register A" (A0 = H0,H1,D0; A1 = H2, H3, D1;...)
B0, B1, B2, ... on Register B" (B0 = D1,D2,D3; B1 = D11,D12,D13;...)
C0, C1, C2, ... on Register C" (C0 = D4,D5,D6; C1 = D14,D15,D16;...)
D0, D1, D2, ... on Register D" (D0 = D7,D8,D9; D1 = D17,D18,D19;...)
E0, E1, E2, ... on Register E" (E0 = Da,Db,Dc; D1 = D1a,D1b,D1c;...)
F0, F1, F2, ... on Register F" (A0 = Dd,De,Df; A1 = D1d,D1e,D1f;...);

X = don't care

Referring to FIG. 4B in the X1 OUTPUT, at time 0, A0, B0, C0, D0, E0, F0 is input to the stages A–F, 200 of the output shuffler 104 and held through time 5 or cycle 5. At time 1, latch B', 202 receives input E0 and latch A", 204 receives input A0. At time 2, latch B', 202 receives input F0 and latch A", 204 receives E0 from latch B', 202. At time 3, latch B', 202 receives input B0 and latch A", 204 receives F0 from latch B', 202. At time 4, latch A', 202 receives input C0, and latch A", 204 receives B0 from latch B', 202. At time 5, latch A", 204 receives C0 from latch A', 202. At time 6, latch A", 206 receives input D0 and continues as shown. The timing cycles for the X2 OUTPUT through the X6 OUTPUT are shown in FIGS. 4A and 4B.

As shown in FIG. 4B, the X1 OUTPUT sequence of A0, E0, F0, B0, C0, D0 of stage A", 204 of output sequencer 104 is applied to stage A, 300 of the input sequencer 106 in cycles 0–5 as shown in X1 INPUT sequence of FIG. 5B. An X2 OUTPUT sequence of A0, C0, D0 of stage A", 204 and B0, F0, E0 of stage B", 204 respectively is applied to stage A, 300 and stage B, 300 of the input sequencer 106 in cycles 0–2 as shown in X2 INPUT sequence of FIG. 5B.

As shown in FIG. 4A, an X3 OUTPUT sequence of A0, D0 of stage A", 204; B0, E0 of stage B", 204, and C0, F0 of stage C", 204 respectively is created. This same sequence is then applied to stage A, 300, stage B, 300 and stage C, 300 of the input sequencer 106 in cycles 0–1 as shown in X3 INPUT sequence of FIG. 5A. An X4 OUTPUT sequence of A0, D1, A1 of stage A", 204; B0, E0, B1 of stage B", 204; C0, F0, C1 of stage C", 204; and D0, F1, E1 of stage D", 204 respectively is applied to stage A, 300, stage B, 300, stage C, 200, and stage D, 200 of the input sequencer 106 in cycles 0–2 as shown in X4 INPUT sequence. An X5 OUTPUT sequence of A0, A1, D1, A2, A3 of stage A", 204; B0, B1, E1, B2, B3 of stage B", 204; C0, C1, C2, F2, C3 of stage C", 204; D0, F1, D2, D3, X of stage D", 204; and E0, F0, E2, E3, F3 respectively is applied to stage A, 300, stage B, 300, stage C, 300, stage D, 300, and stage E, 300 of the input sequencer 106 in cycles 0–4 as shown in X5 INPUT sequence. An X6 OUTPUT sequence of A0 of stage A", 204; B0 of stage B", 204; C0 of stage C", 204; D0 of stage D", 204; E0 of stage E", 204; and F0 of stage F", 204 respectively is applied to stage A, 300, stage B, 300, stage C, 300, stage D, 300, stage E, 300, and stage F, 300 of the input sequencer 106 in cycle 0 as shown in X6 INPUT sequence.

Referring now to FIGS. 6A, 6B, 6C, 6D, 6E and 6F, there are shown shuffle patterns for mapping of data to physical layer links A–F in accordance with the preferred embodiment. For each of the illustrated shuffle patterns, the physical data group (PDG) includes an 18-byte wide data packet including two header bytes and 16 data bytes. Each of the links A–F include three bytes. As shown in 6A, 6B, 6C, 6D, 6E and 6F, an input first data packet PDG0 includes header bytes H0, H1, and data bytes D0, D1, D2, D3, D4, D5, D6, D7, D8, D9, Da, Db, Dc, Dd, De, and Df. As shown in 6A, 6B, and 6C, an input second data packet PDG1 includes header bytes H2, H3, and data bytes D10, D11, D12, D13, D14, D15, D16, D17, D18, D19, D1a, D1b, D1c, D1d, D1e, and D1f. As shown in 6A, and 6B, an input third data packet PDG2 includes header bytes H4, H5, and data bytes D20, D21, D22, D23, D24, D25, D26, D27, D28, D29, D2a, D2b, D2c, D2d, D2e, and D2f. As shown in 6A, and 6B, an input fourth data packet PDG3 includes header bytes H6, H7, and data bytes D30, D31, D32, D33, D34, D35, D36, D37, D38, D39, D3a, D3b, D3c, D23d, D3e, and D3f. Note that in each of the illustrated shuffle patterns in accordance with the preferred embodiment, a number of first header bytes including the first header bytes H0, H1, and data byte D0 are located at a first link A of the plurality of physical layer links A–F.

In FIG. 6A, there is shown a shuffle pattern generally designated by the reference character 600 for data link layer by 6 (X6) mapping of data to physical layer links in accordance with the preferred embodiment. The shuffle pattern 600 spans 1 PDG per cycle. In a first cycle of the shuffle transfer, the links A–F include PDG0 ordered tri-bytes including header bytes H0, H1, and data bytes D0, D1, D2, D3, D4, D5, D6, D7, D8, D9, Da, Db, Dc, Dd, De, and Df. In the second cycle of the cycle of the shuffle transfer, the links A–F include PDG1 ordered tri-bytes including header bytes H2, H3, and data bytes D10, D11, D12, D13, D14, D15, D16, D17, D18, D19, D1a, D1b, D1c, D1d, D1e, and D1f. In the third cycle of the cycle of the shuffle transfer, the links A–F include PDG2 ordered tri-bytes including header bytes H4, H5, and data bytes D20, D21, D22, D23, D24, D25, D26, D27, D28, D29, D2a, D2b, D2c, D2d, D2e, and D2f. In the fourth cycle of the cycle of the shuffle transfer, the links A-F include PDG2 ordered tri-bytes including header bytes H6, H7, and data bytes D30, D31, D32, D33, D34, D35, D36, D37, D38, D39, D3a, D3b, D3c, D3d, D3e, and D3f.

In FIG. 6B, there is shown a shuffle pattern generally designated by the reference character 610 for data link layer by 5 (X5) mapping of data to physical layer links in accordance with the preferred embodiment. The shuffle pattern 610 spans 4 PDGs over 5 cycles. The X6 input includes respective cycles 1–4 of PDG0–PDG3 and cycle 5 of PDG3. In the X5 mapping, in the first cycle of the shuffle pattern 610 data links A–E include ordered tri-bytes including header bytes H0, H1, and data bytes D0, D1, D2, D3, D4, D5, D6, D7, D8, D9, Da, Db, Dc. The second cycle of the shuffle pattern 610 of the X5 mapping, data links A–E include ordered tri-bytes including header bytes H2, H3, D10, D11, D12, D13, D14, D15, D16, D1d, D1e, D1f, Dd, De, and Df. The third cycle of the shuffle pattern 610 of the X5 mapping, respective data links A–E include ordered tri-bytes including data bytes D17, D18, D19, D1a, D1b, D1c, D24, D25, D26, D27, D28, D29, D2a, D2b, and D2c. The fourth cycle of the shuffle pattern 610 of the X5 mapping, data links A–E include ordered tri-bytes including header bytes H4, H5, and data bytes D20, D21, D22, D23, D2d, D2e, D2f, D37, D38, D39, D3a, D3b, and D3c. The fifth cycle of the shuffle pattern 610 of the X5 mapping, data links A–C include ordered tri-bytes including header bytes H6, H7, and data bytes D30, D31, D32, D33, D34, D35, D36 and link E includes data bytes D3d, D3e, and D3f. The X6 output includes respective cycles 2–5 of PDG0–PDG3.

In FIG. 6C, there is shown a shuffle pattern generally designated by the reference character 620 for data link layer by 4 (X4) mapping of data to physical layer links in accordance with the preferred embodiment. The shuffle pattern 620 spans 2 PDGs over 3 cycles. The X4 input includes respective cycles 1–2 of PDG0–PDG1 and cycle 3 of PDG1. In the X4 mapping, in the first cycle of the shuffle pattern 620 data links A–D include ordered tri-bytes including header bytes H0, H1, and data bytes D0, D1, D2, D3, D4, D5, D6, D7, D8, D9. The second cycle of the shuffle pattern 620 of the X4 mapping, data links A–D include ordered tri-bytes including D17, D18, D19, Da, Db, Dc, Dd, De, Df, D1d, D1e, and D1f. The third cycle of the shuffle pattern 620 of the X4 mapping, data links A–D include ordered tri-bytes including header bytes H2, H3, D10, D11, D12, D13, D14, D15, D16, D1a, D1b, and D1c. The X6 output includes respective cycles 2–3 of PDG0–PDG1.

In FIG. 6D, there is shown a shuffle pattern generally designated by the reference character 630 for data link layer by 3 (X3) mapping of data to physical layer links in accordance with the preferred embodiment. The shuffle pattern 630 spans 1 PDG over 2 cycles. The X3 input includes cycles 1–2 of PDG0, each including header bytes H0, H1, and data bytes D0, D1, D2, D3, D4, D5, D6, D7, D8, D9, Da, Db, Dc, Dd, De, and Df. In the X3 mapping, in the first cycle of the shuffle pattern 630 data links A–C include ordered tri-bytes including header bytes H0, H1, and data bytes D0, D1, D2, D3, D4, D5, and D6. The second cycle of the shuffle pattern 630 of the X3 mapping, data links A–C include ordered tri-bytes including D7, D8, D9, Da, Db, Dc, Dd, De, and Df. The X6 output includes cycle 2 of PDG0 including header bytes H0, H1, and data bytes D0, D1, D2, D3, D4, D5, D6, D7, D8, D9, Da, Db, Dc, Dd, De, and Df.

In FIG. 6E, there is shown a shuffle pattern generally designated by the reference character 640 for data link layer by 2 (X2) mapping of data to physical layer links in accordance with the preferred embodiment. The shuffle pattern 640 spans 1 PDG over 3 cycles. The X6 input includes cycles 1–3 of PDG0, each including header bytes H0, H1, and data bytes D0, D1, D2, D3, D4, D5, D6, D7, D8, D9, Da, Db, Dc, Dd, De, and Df. In the X2 mapping, in the first cycle of the shuffle pattern 640 data links A–B include ordered tri-bytes including header bytes H0, H1, and data bytes D0, D1, D2, and D3. The second cycle of the shuffle pattern 640 of the X2 mapping, data links A–B include ordered tri-bytes including data bytes D4, D5, D6, Dd, De, and Df. The third cycle of the shuffle pattern 640 of the X2 mapping, data links A–B include ordered tri-bytes including data bytes D7, D8, D9, Da, Db, and Dc. The X6 output includes cycle 2 of PDG0 including header bytes H0, H1, and data bytes D0, D1, D2, D3, D4, D5, D6, D7, D8, D9, Da, Db, Dc, Dd, De, and Df.

In FIG. 6F, there is shown a shuffle pattern generally designated by the reference character 650 for data link layer by 1 (X1) mapping of data to physical layer links in accordance with the preferred embodiment. The shuffle pattern 650 spans 1 PDG over 6 cycles. The X6 input includes cycles 1–6 of PDG0, each including header bytes H0, H1, and data bytes D0, D1, D2, D3, D4, D5, D6, D7, D8, D9, Da, Db, Dc, Dd, De, and Df. In the X1 mapping, in the first cycle of the shuffle pattern 640 data link A includes ordered tri-bytes including header bytes H0, H1, and data byte D0. The second cycle of the shuffle pattern 650 of the X1 mapping, data link A includes ordered tri-bytes including data bytes Da, Db, Dc. The third cycle of the shuffle pattern 650 of the X1 mapping, data link A includes ordered tri-bytes including data bytes Dd, De, and Df. The fourth cycle of the shuffle pattern 650 of the X1 mapping, data link A includes ordered tri-bytes including data bytes D1, D2, and D3. The fifth cycle of the shuffle pattern 650 of the X1 mapping, data link A includes ordered tri-bytes including data bytes D4, D5, and D6. The sixth cycle of the shuffle pattern 650 of the X1 mapping, data link A includes ordered tri-bytes including data bytes D7, D8, and D9. The X6 output includes cycle 6 of PDG0 including header bytes H0, H1, and data bytes D0, D1, D2, D3, D4, D5, D6, D7, D8, D9, Da, Db, Dc, Dd, De, and Df.

Figure 7:
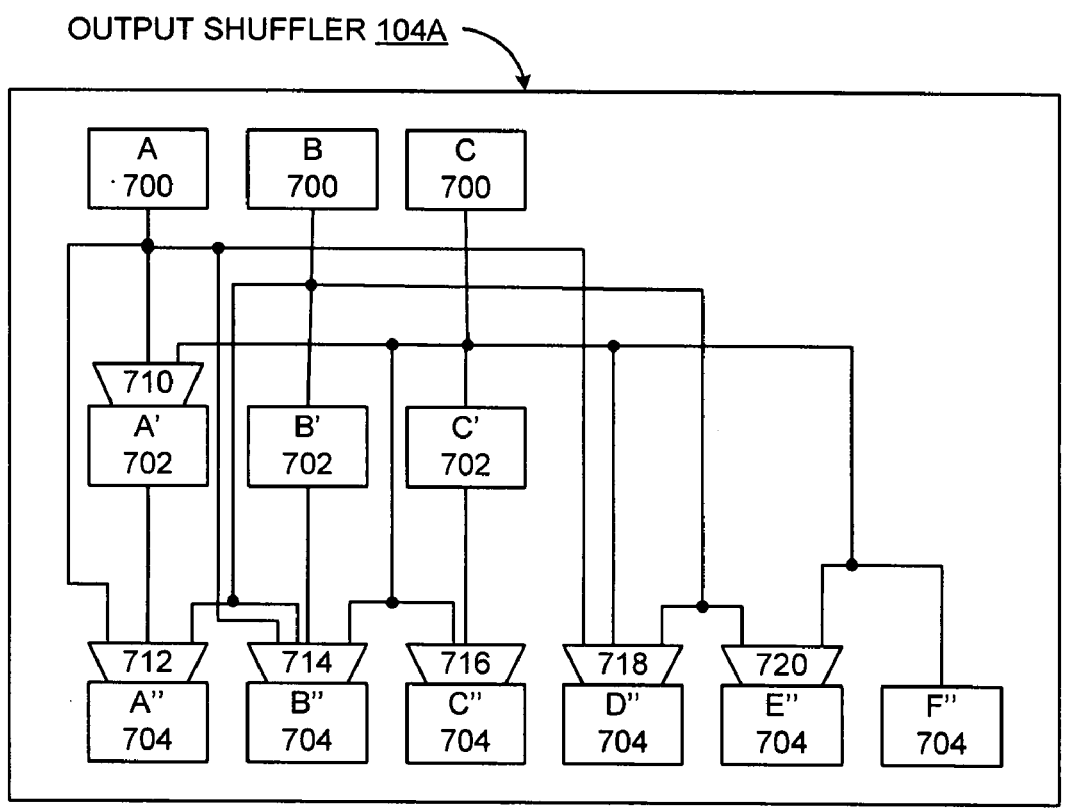
FIG. 7 is a schematic diagram representation illustrating another exemplary output shuffler of the network processor systems of FIGS. 1A and 1B in accordance with the preferred embodiment.
Figure 8:
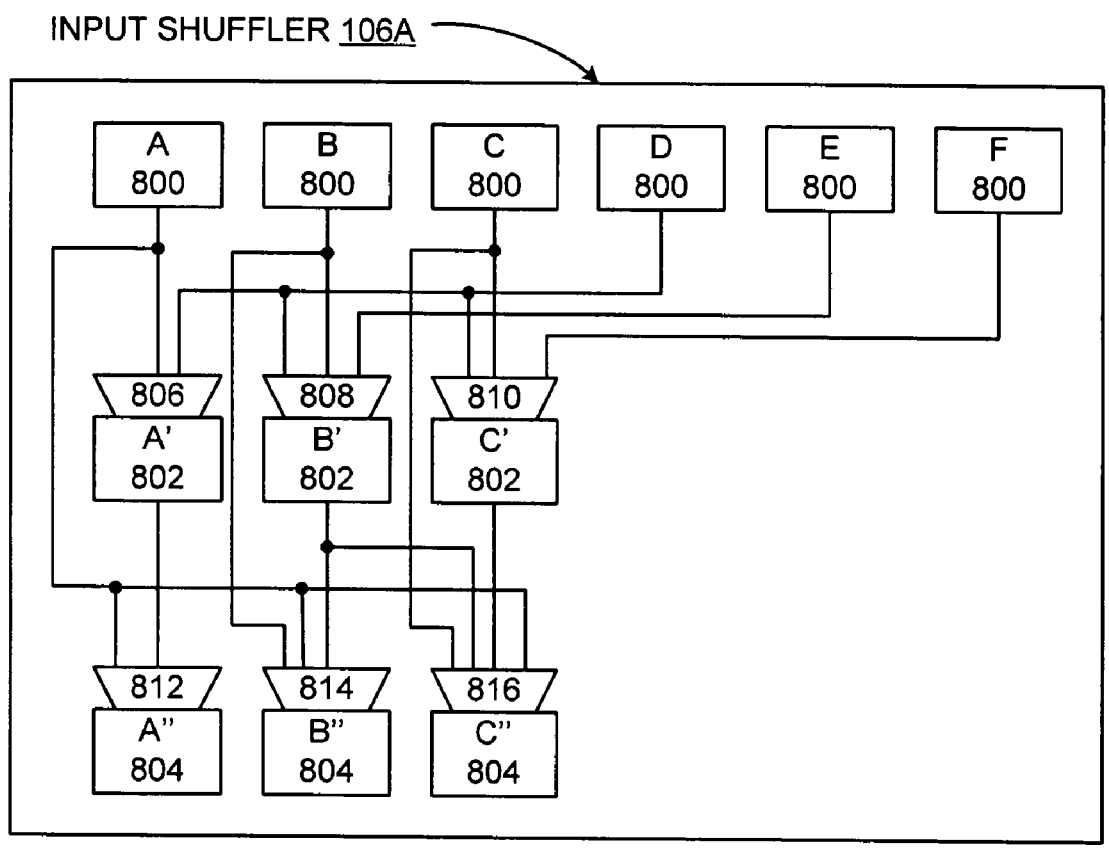
FIG. 8 is a schematic diagram representation illustrating another exemplary input shuffler of the network processor systems of FIGS. 1A and 1B in accordance with the preferred embodiment.

It should be understood that the method for implementing data mapping using a shuffle algorithm of the preferred embodiment is applicable where the number of links is equal to, less than, or greater than a fixed width internal interface. FIGS. 7 and 8, and respective associated timing diagrams of FIGS. 9A, 9B; and 10A, 10B illustrate a second exemplary embodiment for implementing data mapping method using the shuffle algorithm of the preferred embodiment where the number of links is greater than a fixed width internal interface.

Referring now to FIGS. 7 and 8, there are shown respectively a second exemplary output shuffler generally designated by the reference character 104A and a second exemplary input shuffler generally designated by the reference character 106A of the network processor system 100 in accordance with the preferred embodiment. The output shuffler 104A and input shuffler 106A are used for mapping a plurality of output and input links to a fixed width internal interface where the number of links is six, each 3 bytes or one tri-byte and the fixed width internal interface is 9 bytes wide or three tri-bytes wide.

In FIG. 7, the exemplary output shuffler 104A of the network processor system 100 in accordance with the preferred embodiment includes a first register stage including a plurality of first stage registers 700, A, B, C, each is a subplurality of bytes wide, such as 3 B and receives 3 bytes or one tri-byte of processor data coming into the output shuffler 104A, as shown in FIGS. 9A and 9B. A second register stage includes a plurality of second stage registers 702, A', B', C', and a third register stage includes a plurality of third stage registers 704, A", B", C", D", E", F". Each of the second stage registers 702 and third stage registers 704 is a subplurality of bytes wide, such as 3B. A multiplexer 710 is coupled between the first stage registers 700, A, C and the second stage register 702, A' and a plurality of multiplexers 712, 714, 716, 718, 720 is coupled between selected first stage registers 700, A, B, C, second stage registers 702, A', B', C', and the third stage registers 704, A", B", C", D", E". Multiplexer 714 is a 4-to-1 multiplexer and is the largest multiplexer. Multiplexers 712, 718 are 3-to-1 multiplexers. Multiplexers 710, 716, 720 are 2-to-1 multiplexers. The first stage registers 700, A, B, C are connected to selected ones of the second stage registers 702, A', B', C', and third stage registers 704, A", B", C", D", E", F" to enable funneling of subplurality bytes in one cycle. The third stage registers 704, A", B", C", D", E", F" provides ordered subplurality data bytes for each shuffle transfer that are applied to the input shuffler 106A or bridge chip 108 using respective links 110.

FIG. 8 illustrates the second exemplary input shuffler 106A of the network processor system in accordance with the preferred embodiment. The input shuffler 106A includes a first register stage, for example, coupled to the third stage registers 704, A", B", C", D", E", F" of the output shuffler 104A. The first register stage includes a plurality of first stage registers 800, A, B, C, D, E, F, each first stage register 800 is a subplurality of bytes wide, such as 3 B wide, and each first stage register 800 receiving respective 3 bytes or a tri-byte output from the output shuffler 104A or bridge chip 108 on respective links 110. A second register stage includes a plurality of second stage registers 802, A', B', C', and a third register stage includes a plurality of third stage registers 804, A", B", C". Each of the second stage registers 802, A', B', C', and third stage registers 804, A", B", C" is a subplurality of bytes wide, such as 3 B wide. A plurality of multiplexers 806, 808, 810 is coupled between selected first stage registers 800, A, B, C, and the second stage registers 802, A', B', C', and a respective multiplexer 812, 814, 816 is coupled between the second stage registers 802, A', B', C', and the third stage registers 804, A", B", C" and selected ones of the first stage registers 800, A, B, C, D, E, F. Multiplexer 816 is a 4-to-1 multiplexer and the largest multiplexer. Multiplexers 808, 810, 814 are 3-to-1 multiplexers. Multiplexers 806, 812 are 2-to-1 multiplexers. Selected ones of the first stage registers 800, A, B, C, D, E, F are connected to the multiplexers 806, 808, 810, 812, 814, 816 to enable funneling of subplurality bytes in one cycle.

FIGS. 9A and 9B together provide a timing diagram illustrating output staging generally designated by the reference character 900 of the exemplary output shuffler 104A in accordance with the preferred embodiment. In FIGS. 9A and 9B, one complete shuffle sequence including X1 OUTPUT, X2 OUTPUT, X3 OUTPUT of FIG. 9B and X4 OUTPUT, X5 OUTPUT, X6 OUTPUT of FIG. 9A is shown for the output shuffler 104A. One input sequence within highlighted or shaded time cycles of the mapping or output staging sequences X1 OUTPUT, X2 OUTPUT, X3 OUTPUT, X4 OUTPUT, X5 OUTPUT, X6 OUTPUT are shown to illustrate how these input sequence are shuffled onto the output. Data that must be held from a previous cycle in the registers A, B, C, A", B" is shown highlighted by heavier lines in the output staging sequences X1 OUTPUT, X5 OUTPUT. As shown in FIGS. 9A and 9B, 3 bytes or tri-bytes coming into the output shuffler 104A on a respective one of six data links 110, A–F, are represented as shown in the TABLE 1 for Registers A, B, and C.

Referring also to FIGS. 10A and 10B together provide a timing diagram illustrating input staging generally designated by the reference character 1000 of the exemplary input shuffler 106A in accordance with the preferred embodiment. In FIGS. 10A and 10B, one complete reverse shuffle sequence including X1 INPUT, X2 INPUT, X3 INPUT of FIG. 10B and X4 INPUT, X5 INPUT, X6 INPUT of FIG. 10A is shown for the input shuffler 106A. As shown in FIGS. 10A and 10B, 3 bytes coming out of the input shuffler 106A are represented as shown in the above TABLE 2 for Registers A", B", and C". Data that must be held from a previous cycle in the input registers A, B, is shown highlighted by heavier lines in the output staging sequences X5 OUTPUT. Highlighted or shaded time cycles of the mapping or output staging sequences X2 OUTPUT, X3 OUTPUT, X4 OUTPUT, X5 OUTPUT, X6 OUTPUT show one shuffled input sequence and when that data can be validly read at output.

While the present invention has been described with reference to the details of the embodiments of the invention shown in the drawing, these details are not intended to limit the scope of the invention as claimed in the appended claims.

What is claimed is:

1. A method for implementing data mapping using a shuffle algorithm comprising the steps of:

using an output shuffler and an input shuffler to transfer data of different widths; said output shuffler and said input shuffler converting a physical data group to a plurality of input data subgroups, said physical data group including a plurality of bits of a first data width and each subgroup including a subplurality of bits of a second data width;

performing an output shuffle sequence with said output shuffler for providing a predefined output pattern of ordered subplurality data bits with said predefined output pattern of ordered subplurality data bits including predefined first header bytes defining the beginning of a new frame of data; said predefined first header bytes being provided to a first data subgroup of said predefined output pattern of ordered subplurality data bits;

applying said predefined output pattern of ordered subplurality data bits of said output shuffler to said input shuffler with said predefined first header bytes in said first data subgroup being provided in a first clock cycle; and performing a reverse shuffle sequence with said input shuffler.

2. A method for implementing data mapping using a shuffle algorithm as recited in claim 1 wherein said plurality of input data subgroups includes a selected number N of subgroups, and said subplurality of bits times said number N of subgroups is equal to, less than, or greater than said plurality of bits of said physical data group.

3. A method for implementing data mapping using a shuffle algorithm as recited in claim 2 wherein said physical data group includes one of 9 bytes or 18 bytes.

4. A method for implementing data mapping using a shuffle algorithm as recited in claim 1 wherein said predefined first header bytes defining the beginning of a new frame of data are represented by three first header bytes A0=H0,H1,D0 and wherein the step of performing said shuffle sequence with said output shuffler for providing said predefined pattern of ordered subplurality data bits for the shuffle sequence with said predefined first header bytes A0=H0,H1,D0 provided to said first data subgroup and wherein the step of applying said predefined output pattern of ordered subplurality data bits of said output shuffler to said input shuffler with said predefined first header bytes A0=H0,H1,D0 in said first data subgroup being provided in said first clock cycle of said predefined output pattern of ordered subplurality data bits are used for enabling power management in said input shuffler allowing said input shuffler to be shut off to save power when there is no data to unshuffle.

5. A method for implementing data mapping using a shuffle algorithm as recited in claim 3 wherein said output shuffler includes a plurality of sequential register stages and a plurality of multiplexers coupled between selected ones of said sequential register stages; and a largest one of said plurality of multiplexers being a 4-to-1 multiplexer.

6. A method for implementing data mapping using a shuffle algorithm as recited in claim 3 wherein said input shuffler includes a plurality of sequential register stages and a plurality of multiplexers coupled between selected ones of said sequential register stages; and a largest one of said plurality of multiplexers being a 4-to-1 multiplexer.

7. A method for implementing data mapping using a shuffle algorithm as recited in claim 2 wherein N equals 6 and said physical data group includes 18 bytes and wherein X6 mapping provides said predefined pattern includes one said physical data group per cycle.

8. A method for implementing data mapping using a shuffle algorithm as recited in claim 2 wherein N equals 5 and said physical data group includes 18 bytes and wherein X5 mapping provides said predefined output pattern of ordered subplurality data bytes spanning four said physical data groups over 5 cycles.

9. A method for implementing data mapping using a shuffle algorithm as recited in claim 2 wherein N equals 4 and said physical data group includes 18 bytes and wherein X4 mapping provides said predefined output pattern spanning two said physical data groups over 3 cycles.

10. A method for implementing data mapping using a shuffle algorithm as recited in claim 2 wherein N equals 3 and said physical data group includes 18 bytes and wherein X3 mapping provides said predefined output pattern spanning one said physical data group over 2 cycles.

11. A method for implementing data mapping using a shuffle algorithm as recited in claim 2 wherein N equals 2 and said physical data group includes 18 bytes and wherein X2 mapping provides said predefined output pattern spanning one said physical data group over 3 cycles.

12. A method for implementing data mapping using a shuffle algorithm as recited in claim 2 wherein N equals 1 and said physical data group includes 18 bytes and wherein X1 mapping provides said predefined output pattern spanning one said physical data group over 6 cycles.

13. A method for implementing data mapping using a shuffle algorithm as recited in claim 2 wherein N equals 6 and said physical data group includes 9 bytes and wherein X6 mapping provides said predefined pattern includes two said physical data groups over 1 cycles.

14. A method for implementing data mapping using a shuffle algorithm as recited in claim 2 wherein N equals 5 and said physical data group includes 9 bytes and wherein X5 mapping provides said predefined output pattern of ordered subplurality data bytes spanning five said physical data groups over 4 cycles.

15. A method for implementing data mapping using a shuffle algorithm as recited in claim 2 wherein N equals 4 and said physical data group includes 9 bytes and wherein X4 mapping provides said predefined output pattern spanning four said physical data groups over 1 cycles.

16. A method for implementing data mapping using a shuffle algorithm as recited in claim 2 wherein N equals 3 and said physical data group includes 9 bytes and wherein X3 mapping provides said predefined output pattern spanning one said physical data group per cycle.

17. A method for implementing data mapping using a shuffle algorithm as recited in claim 2 wherein N equals 2 and said physical data group includes 9 bytes and wherein X2 mapping provides said predefined output pattern spanning two said physical data groups over 3 cycles.

18. A method for implementing data mapping using a shuffle algorithm as recited in claim 2 wherein N equals 1 and said physical data group includes 9 bytes and wherein X1 mapping provides said predefined output pattern spanning one said physical data group over 3 cycles.

19. Apparatus for implementing data mapping using a shuffle algorithm comprising:
an output shuffler and an input shuffler used to transfer data of different widths; said output shuffler and said input shuffler for converting a physical data group to a selected number of data subgroups, said physical data group including a plurality of bits, and each subgroup including a subplurality of bits;
said output shuffler for performing a shuffle sequence and providing a predefined output pattern of ordered subplurality data bits with said predefined output pattern of ordered subplurality data bits including predefined first header bytes defining the beginning of a new frame of data; said predefined first header bytes being provided in a first data subgroup of said predefined output pattern of ordered subplurality data bits; and
said predefined output pattern of ordered subplurality data bits applied to said input shuffler with said predefined first header bytes in said first data subgroup being provided in a first clock cycle for performing a reverse shuffle sequence; said predefined first header bytes for enabling power management in said input shuffler; allowing said input shuffler to be shut off to save power when there is no data to unshuffle.

20. Apparatus for implementing data mapping using a shuffle algorithm as recited in claim 19 wherein said plurality of input data subgroups includes a selected number N of subgroups, and said subplurality of bits times said number N of subgroups is equal to, less than, or greater than said plurality of bits of said physical data group.

21. Apparatus for implementing data mapping using a shuffle algorithm as recited in claim 19 wherein said physical data group includes one of 9 bytes or 18 bytes.

22. Apparatus for implementing data mapping using a shuffle algorithm as recited in claim 20 wherein said output shuffler includes a first register stage coupled to an internal interface and said first register stage includes a first number of first stage registers, each first stage register is a subplurality of bits wide.

23. Apparatus for implementing data mapping using a shuffle algorithm as recited in claim 22 wherein said output shuffler includes a second register stage including a second number of second stage registers and a third register stage including said first number of third stage registers; each of said second stage registers and third stage registers is a subplurality of bits wide.

24. Apparatus for implementing data mapping using a shuffle algorithm as recited in claim 23 wherein said output shuffler includes at least one multiplexer coupled between selected ones of said first stage registers and at least one of said second stage registers and a plurality of multiplexers coupled between at least one of said second stage registers and said third stage registers; selected ones of said first stage registers are connected to selected ones of said second stage registers and said third stage registers to enable funneling of subplurality bits in one cycle; and said third stage registers providing said predefined output pattern of ordered subplurality data bits.

25. Apparatus for implementing data mapping using a shuffle algorithm as recited in claim 24 wherein a largest one of said multiplexers is a 4-to-1 multiplexer.

26. Apparatus for implementing data mapping using a shuffle algorithm as recited in claim 20 wherein said input shuffler includes a first register stage including a plurality of first stage registers, each said first stage register is a subplurality of bits wide.

27. Apparatus for implementing data mapping using a shuffle algorithm as recited in claim 26 wherein said input shuffler includes a second register stage including a plurality of second stage registers and a third register stage including a plurality of third stage registers; each of said second stage registers and said third stage registers is a subplurality of bits wide.

28. Apparatus for implementing data mapping using a shuffle algorithm as recited in claim 27 wherein said input shuffler includes a plurality of multiplexers coupled between selected ones of said first stage registers and said second stage registers and a plurality of multiplexers coupled between selected ones of said second stage registers and said third stage registers; said third stage registers providing a reverse shuffle sequence output.

29. Apparatus for implementing data mapping using a shuffle algorithm as recited in claim 28 wherein a largest one of said multiplexers is a 4-to-1 multiplexer.

* * * * *